US009682682B2

(12) United States Patent
Aoki et al.

(10) Patent No.: US 9,682,682 B2
(45) Date of Patent: Jun. 20, 2017

(54) VEHICLE SEAT WITH A ROTATABLE BELT GUIDE

(71) Applicant: TOYOTA JIDOSHA KABUSHIKI KAISHA, Toyota-shi, Aichi-ken (JP)

(72) Inventors: Norihisa Aoki, Toyota (JP); Kohshi Katoh, Hadano (JP); Eishi Takeuchi, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/662,592

(22) Filed: Mar. 19, 2015

(65) Prior Publication Data

US 2015/0266448 A1    Sep. 24, 2015

(30) Foreign Application Priority Data

Mar. 24, 2014 (JP) .................................. 2014-060635

(51) Int. Cl.
*B60R 22/20* (2006.01)
*B60R 22/18* (2006.01)
(Continued)

(52) U.S. Cl.
CPC .............. *B60R 22/20* (2013.01); *B60N 2/10* (2013.01); *B60N 2/22* (2013.01); *B60N 2/39* (2013.01); *B60N 2/4876* (2013.01); *B60N 2/688* (2013.01); *B60R 22/18* (2013.01); *B60R 22/26* (2013.01); *B60N 2002/022* (2013.01);
(Continued)

(58) Field of Classification Search
CPC . B60R 22/26; B60R 2022/1818; B60R 22/20; B60R 2022/263; B60R 2022/1831; B60R 22/18; B60N 2/688; B60N 2/39; B60N 2/10; B60N 2/22; B60N 2002/0212; B60N 2002/022; B60N 2/4876
USPC ....... 297/483, 473, 314, 484, 354.11, 354.1; 280/808
See application file for complete search history.

(56) References Cited

U.S. PATENT DOCUMENTS 3,466,089 A * 9/1969 Stueckle .................... 297/314
6,267,409 B1   7/2001 Townsend et al. ............. 813/15
(Continued)

FOREIGN PATENT DOCUMENTS

EP    1514748 A1   3/2005
JP    S60-87748 U   6/1985
(Continued)

*Primary Examiner* — Milton Nelson, Jr.
(74) *Attorney, Agent, or Firm* — Andrews Kurth Kenyon LLP (57) ABSTRACT

There is provided a vehicle seat including: a seat main body including a seating portion, a seat back that supports an upper body of the vehicle occupant seated on the seating portion, and a headrest that is provided at an upper side of the seat back and supports a head portion of the vehicle occupant; a seatbelt that restrains the upper body of the vehicle occupant with respect to the seat back; a belt guide portion that is provided at an upper portion of the seat back or at the headrest, and through which the seatbelt is inserted, and that guides the seatbelt; and a rotating portion that, following movement of a shoulder portion of the vehicle occupant, changes a direction of guiding the seatbelt by rotating the belt guide portion by external force applied due to tension of the seatbelt.

6 Claims, 10 Drawing Sheets

(51) Int. Cl.
  *B60N 2/68* (2006.01)
  *B60R 22/26* (2006.01)
  *B60N 2/39* (2006.01)
  *B60N 2/48* (2006.01)
  *B60N 2/10* (2006.01)
  *B60N 2/22* (2006.01)
  *B60N 2/02* (2006.01)

(52) U.S. Cl.
  CPC .............. *B60N 2002/0212* (2013.01); *B60R 2022/1818* (2013.01); *B60R 2022/1831* (2013.01); *B60R 2022/263* (2013.01)

(56) References Cited

U.S. PATENT DOCUMENTS

| | | |
|---|---|---|
| 7,618,097 B2 * | 11/2009 | Ghatge ..................... 297/473 |
| 2011/0148160 A1 | 6/2011 | Meeker et al. ................ 813/15 |
| 2013/0278042 A1 * | 10/2013 | Wenz et al. ................ 297/463.1 |
| 2014/0191550 A1 | 7/2014 | Katoh et al. |

FOREIGN PATENT DOCUMENTS

| | | |
|---|---|---|
| JP | H06-107123 A | 4/1994 |
| JP | 2009-530176 A | 8/2009 |
| JP | 2010-023750 A | 2/2010 |
| JP | 2012-006479 A | 1/2012 |
| WO | 2007107881 A1 | 9/2007 |
| WO | 2013/021497 A1 | 2/2013 |

* cited by examiner

VEHICLE SEAT WITH A ROTATABLE BELT GUIDE

CROSS-REFERENCE TO RELATED APPLICATION

This application is based on and claims priority under 35 USC 119 from Japanese Patent Application No. 2014-060635 filed on Mar. 24, 2014, the disclosure of which is incorporated by reference herein.

BACKGROUND

Technical Field

The present invention relates to a vehicle seat.

Related Art

WO 2013/021497, for example, discloses a technique relating to a vehicle seat in which a seat back and a seating surface are disposed rotatably, and, when the vehicle turns, the performance of maintaining the posture of the vehicle occupant is improved. Further, Japanese Patent Application Laid-Open (JP-A) No. 2012-006479 discloses a technique in which an opening portion is formed in the upper portion of a seat back, and a belt guide supporting portion that guides a seatbelt is mounted within this opening portion. Moreover, JP-A No. 2010-023750 discloses a technique in which a seatbelt guide that guides a seatbelt can be fixed at a predetermined position at the seat back in accordance with the physique or the preferences of the vehicle occupant.

However, in these prior art, there is room for improvement with regard to the point of, in a case in which the posture of the upper body of a vehicle occupant who is restrained by a seatbelt changes, causing the seatbelt to follow the shoulder portion of the vehicle occupant.

SUMMARY

An object of the present invention is to provide a vehicle seat that, even if the posture of the upper body of a vehicle occupant who is restrained by a seatbelt changes, can cause the seatbelt to follow the shoulder portion of the vehicle occupant.

A first aspect of the present invention provides a vehicle seat including:
- a seat main body that is structured to include a seating portion on which a vehicle occupant sits, a seat back that supports an upper body of the vehicle occupant seated on the seating portion, and a headrest that is provided at an upper side of the seat back and supports a head portion of the vehicle occupant;
- a seatbelt that restrains the upper body of the vehicle occupant with respect to the seat back;
- a belt guide portion that is provided at an upper portion of the seat back or at the headrest, and through which the seatbelt is inserted, and that guides the seatbelt; and
- a rotating portion that, following movement of a shoulder portion of the vehicle occupant whose upper body is restrained by the seatbelt, changes a direction of guiding the seatbelt by rotating the belt guide portion by external force that is applied due to tension of the seatbelt.

In the vehicle seat of the first aspect of the present invention, the seat main body is structured to include the seating portion on which a vehicle occupant sits, the seat back that supports the upper body of the vehicle occupant seated on the seating portion, and the headrest that is provided at the upper side of the seat back and supports the head portion of the vehicle occupant. Further, the upper body of the vehicle occupant that is supported by the seat back is restrained by the seatbelt with respect to the seat back.

Here, the belt guide portion, through which the seatbelt is inserted and that guides the seatbelt, is provided at the upper portion of the seat back or at the headrest. This belt guide portion has the rotating portion. Due to external force that is applied due to tension of the seatbelt following movement of the shoulder portion of the vehicle occupant whose upper body is restrained by the seatbelt, the rotating portion rotates the belt guide portion, and thereby changes the direction of guiding the seatbelt.

Due thereto, for example, when the vehicle occupant whose upper body is restrained by the seatbelt swings in the vehicle transverse direction due to centrifugal force at the time when the vehicle turns, the position of the shoulder portion of the vehicle occupant with respect to the vehicle changes. However, in accordance with the present invention, due to the rotating portion, the belt guide portion rotates, and direction of guiding the seatbelt is changed. Therefore, even if the vehicle occupant swings in the vehicle transverse direction, the seatbelt can be made to follow in accordance with the position of the shoulder portion of the vehicle occupant.

A second aspect of the present invention provides the vehicle seat of the first aspect, wherein the rotating portion includes a shaft portion that rotates the belt guide portion around an axis that runs at least along a vehicle vertical direction.

In the vehicle seat of the second aspect of the present invention, the rotating portion has the shaft portion that is provided along at least the vehicle vertical direction. The rotating portion rotates the belt guide portion around the axis of this shaft portion. Here, because the shaft portion has an axis that "runs at least along a vehicle vertical direction", the shaft portion may be formed, for example, along an axis that is tilted in the vehicle longitudinal direction with respect to an axis that runs along the vehicle vertical direction.

A third aspect of the present invention provides the vehicle seat of the first aspect or the second aspect, further including a first swinging portion that swings the seat back around a first axis that runs along a vehicle longitudinal direction.

The vehicle seat of the third aspect of the present invention further has the first swinging portion that swings the seat back. This first swinging portion can swing the seat back around the first axis that runs along the vehicle longitudinal direction. Therefore, when the vehicle occupant swings along the vehicle transverse direction at the time when the vehicle turns, the seat back swings around the first axis, which runs along the vehicle longitudinal direction, following the swinging of the upper body of the vehicle occupant. Note that the seat back may be set such that the entirety thereof swings around the first axis due to the first swinging portion, or may be set such that a portion of the seat back, that includes the supporting surface that the upper body of the vehicle occupant contacts, is swung around the first axis with respect to the other portions of the seat back.

A fourth aspect of the present invention provides the vehicle seat of any one of the first through third aspects, further including a second swinging portion that swings the seating portion around a second axis that runs along a vehicle longitudinal direction.

The vehicle seat of the fourth aspect of the present invention further has the second swinging portion that swings the seating portion. This second swinging portion can swing the seating portion around the second axis that runs along the vehicle longitudinal direction. Therefore, when the vehicle occupant swings along the vehicle transverse direction at the time when the vehicle turns, the lumbar region of the vehicle occupant can be swung accompanying the swinging of the seating portion. Note that the seating portion may be set such that the entirety thereof swings around the second axis due to the second swinging portion, or may be set such that a portion of the seating portion, that includes the seating surface that the lumbar region of the vehicle occupant contacts, is swung around the second axis with respect to the other portions of the seating portion.

A fifth aspect of the present invention provides the vehicle seat of any one of the first through fourth aspects, wherein the belt guide portion is structured to include:

a pair of wall portions that are disposed so as to face one another, and that restrict movement of the seatbelt in a belt transverse direction;

hook portions that extend in directions of approaching one another from upper end portions of the wall portions; and inclined surfaces that are formed at facing regions of the pair of wall portions, and that are inclined in directions of moving away from one another while heading toward a vehicle longitudinal direction rear side.

In the vehicle seat of the fifth aspect of the present invention, at the belt guide portion, the pair of wall portions, that restrict movement of the seatbelt in the vehicle transverse direction, are provided so as to face one another. Hook portions extend, in directions of approaching one another, from the upper end portions of the wall portions. Further, the inclined surfaces are formed at the facing regions of the pair of wall portions, and these inclined surfaces are inclined in directions of moving away from one another while heading toward the vehicle longitudinal direction rear side.

Due thereto, when viewing the belt guide portion from above, the amount of overlap of the hook portions and the seatbelt is greater at the rear portion than at the front portion. Because a shoulder anchor, that is disposed at the vehicle body side and at which the seatbelt is folded-back, is generally provided at the rear side of the seat back, by increasing the amount of overlap with the seatbelt at the rear portion of the belt guide portion, it can be made difficult for the seatbelt to come-out from the belt guide portion.

A sixth aspect of the present invention provides the vehicle seat of any one of the first through fifth aspects, wherein the rotating portion includes a slide portion that slides the belt guide portion at least along a vehicle transverse direction.

In the vehicle seat of the sixth aspect of the present invention, the rotating portion has the slide portion that slides the belt guide portion at least along the vehicle transverse direction. The belt guide portion can be set at an appropriate position in accordance with the physique of the vehicle occupant seated at the seat main body. Here, because the slide portion can slide the belt guide portion "at least along a vehicle transverse direction", for example, the slide portion can also be set such that the belt guide portion slides along the vehicle transverse direction and the vehicle vertical direction, along the shape of the upper portion of the seat main body.

As described above, the vehicle seat of the first aspect of the present invention has the excellent effect of being able to make the seatbelt follow the shoulder portion of the vehicle occupant, even if the posture of the upper body of the vehicle occupant, who is restrained by the seatbelt, changes.

The vehicle seat of the second aspect of the present invention, has the excellent effect that the belt guide portion can be rotated by a simple structure.

The vehicle seat of the third aspect of the present invention has the excellent effect that, following the swinging of the upper body of the vehicle occupant, the seat back can be swung around the first axis that runs along the vehicle longitudinal direction.

The vehicle seat of the fourth aspect of the present invention has the excellent effect that the lumbar region of the vehicle occupant can be moved.

The vehicle seat of the fifth aspect of the present invention has the excellent effect of making it difficult for the seatbelt to come-out from the belt guide portion.

The vehicle seat of the sixth aspect of the present invention has the excellent effect that the belt guide portion can be set at an appropriate position in accordance with the physique of the vehicle occupant who is seated at the seat main body, or the shape of the upper portion of the seat main body.

BRIEF DESCRIPTION OF THE DRAWINGS

Exemplary embodiments of the present invention will be described in detail based on the following figures, wherein.

DETAILED DESCRIPTION

A vehicle seat relating to the present embodiment is described hereinafter on the basis of the drawings. Note that arrow UP in the drawings indicates the vehicle upward direction, arrow FR indicates the vehicle front direction, arrow RH indicates the vehicle right direction, and arrow LH indicates the vehicle left direction, respectively. In the following description, when longitudinal, vertical, and left and right directions are used, they mean the longitudinal of the vehicle longitudinal direction, the vertical of the vehicle vertical direction, and the left and right of the vehicle left-right direction (vehicle transverse direction), unless otherwise stated.

Structure of Vehicle Seat

Figure 1:
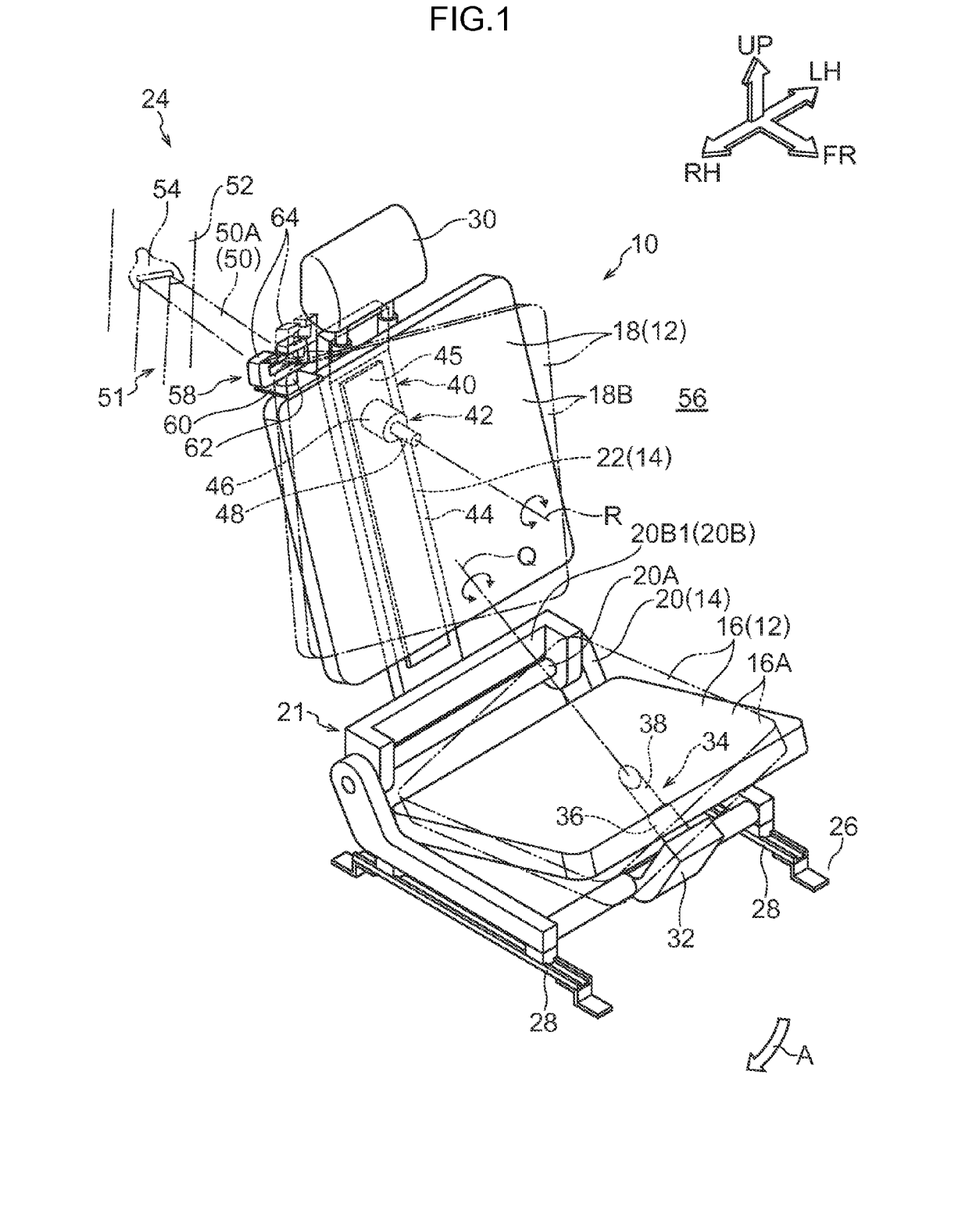
FIG. 1 is a perspective view showing the schematic overall structure of a vehicle seat relating to the present embodiment.

First, the structure of a vehicle seat relating to the embodiments of the present invention is described. A vehicle seat 10 relating to the present embodiment is shown schematically in FIG. 1. As shown in FIG. 1, the vehicle seat 10 has a seat main body 12 that is structured to include a seating portion 16 on which a vehicle occupant sits, a seat back 18 that supports the upper body of the vehicle occupant seated on the seating portion 16, and a headrest 30 that is provided at the upper side of the seat back 18 and supports the head portion of the vehicle occupant. Note that, here, the seating portion 16 is substantially rectangular as seen in plan view, and the seat back 18 is substantially rectangular as seen in a front view. However, the shapes thereof can be changed appropriately by cushion members or the like.

The seat main body 12 is supported by a seat main body frame 14. The seat main body frame 14 is structured to include a lower portion seat frame 20 that supports the seating portion 16, and an upper portion seat frame 22 that supports the seat back 18. The lower portion seat frame 20 is provided so as to be movable along the vehicle longitudinal direction with respect to seat rails 28 that are fixed to a vehicle floor 26.

A so-called reclining mechanism 21 is provided at the rear portion of the lower portion seat frame 20. The reclining mechanism 21 has a fixed shaft 20A that is fixed along the vehicle transverse direction to the lower portion seat frame 20. A frame connecting portion 20B, that is substantially U-shaped with the vehicle front side thereof being open as seen in plan view, is axially-supported at the fixed shaft 20A and can rotate around the axis of the fixed shaft 20A. Further, the upper portion seat frame 22 is provided erect from the central portion of a rear wall 20B1 that structures the rear portion of the frame connecting portion 20B. The headrest 30 is provided at the upper portion of this upper portion seat frame 22. Further, due to the reclining mechanism 21, the upper portion seat frame 22 is made to be able to tilt with respect to the lower portion seat frame 20.

Further, a mounting plate 32, that is inclined upward while heading forward, is provided at the central portion of the front end of the lower portion seat frame 20. A thrust bearing 36, that is directed toward the rear side and the upper side and that structures a portion of a seating portion supporting mechanism 34 that serves as a second swinging portion, is fixed to the central portion in the vehicle transverse direction of this mounting plate 32.

The lower end portion of a thrust shaft 38 is fit-together with the thrust bearing 36. An axis Q, that serves as a second axis, of the thrust shaft 38 is an axis that heads from the thrust bearing 36 toward the vehicle longitudinal direction rear side and the vehicle vertical direction upper side (forms an angle of elevation toward the vehicle rear side with the vehicle floor 26 being the reference), and is set so as to pass through the vicinity of the pit of the stomach of the vehicle occupant seated on the seating portion 16. Note that the thrust shaft 38 is set so as to be able to rotate within a predetermined range (e.g., ±approximately 10°) with respect to the thrust bearing 36. Note that this angle can be set appropriately in accordance with the size of a vehicle 24 or the like.

Further, the seating portion 16 is fixed to the distal end portion of this thrust shaft 38. As described above, the axis Q of the thrust shaft 38 is an axis that runs along the vehicle longitudinal direction and the vehicle vertical direction. Therefore, the seating portion 16 that is fixed to the thrust shaft 38 can swing around the thrust shaft 38 along the roll direction and the yaw direction of the vehicle 24. Note that the seating portion 16 may be set such that the entirety thereof swings around the axis Q, or may be set such that a portion of the seating portion 16, that includes a seating surface 16A that the lumbar region of the vehicle occupant contacts, is swung around the axis Q with respect to the other portions of the seating portion 16.

On the other hand, the upper portion seat frame 22 is structured to include a height adjusting mechanism 40 that moves the seat back 18 along the vehicle vertical direction, and a seat back supporting mechanism 42 that serves as a first swinging portion and that swingably supports the seat back 18.

To explain an example of the height adjusting mechanism 40, the height adjusting mechanism 40 has, at the upper portion seat frame 22, a slide rail 44 that extends along the vehicle vertical direction. On the other hand, the seat back 18 has a supporting member 45 that moves along this slide rail 44. An unillustrated ball screw is provided at the slide rail 44 side along the length direction of the slide rail 44. A nut, to which the supporting member 45 is fixed, is screwed-together with the ball screw. Therefore, when the ball screw is rotated, the supporting member 45 moves via the nut in the vehicle vertical direction along the slide rail 44.

Further, an unillustrated fixing member is provided at the slide rail 44, and the seat back 18 is fixed to the slide rail 44 by this fixing member. By cancelling the state of fixing by this fixing member, the seat back 18 becomes able to move along the length direction of the slide rail 44 via the supporting member 45. Due to the moving of the supporting member 45, the height of the seat back 18 can be adjusted in accordance with the seated height of the vehicle occupant.

On the other hand, at the seat back supporting mechanism 42, for example, a thrust bearing 46 is fixed to the front portion of the supporting member 45 toward the front side, such that the axis of the thrust bearing 46 is disposed along the vehicle longitudinal direction. A thrust shaft 48 is fit-together with this thrust bearing 46, and the seat back 18 is fixed to the front end portion of the thrust shaft 48.

An axis R, that serves as a first axis, of the thrust shaft 48 is an axis that runs along the vehicle longitudinal direction, and the seat back 18 can swing around this axis R along the roll direction of the vehicle 24. Note that the thrust shaft 48 is set so as to be able to rotate in a predetermined range (e.g., ±approximately 10°) with respect to the thrust bearing 46. Note that this angle can be set appropriately in accordance with the size of the vehicle 24 or the like. Further, the seat back 18 may be set such that the entirety thereof swings around the axis R, or may be set such that a portion of the seat back 18, that includes a supporting surface 18B that the upper body of the vehicle occupant contacts, is swung around the axis R with respect to the other portions of the seat back 18.

Further, a so-called three-point seatbelt device 51 is provided at the seat main body 12. The seatbelt device 51 has a seatbelt 50 that is structured to include a shoulder belt 50A that restrains the upper body of the vehicle occupant seated at the seat main body 12 (the seated vehicle occupant), and a lap belt (not illustrated) that restrains the lumbar region of the seated vehicle occupant.

One end side of the seatbelt 50 is taken-up, by an unillustrated retractor that is disposed within the lower portion of a center pillar 52 that serves as a vehicle body, such that the seatbelt 50 can be pulled-out toward a vehicle cabin 56 inner side. A shoulder anchor 54 is disposed at the upper portion side of the center pillar 52. The seatbelt 50, that has been pulled-out from the center pillar 52, is folded-back at the shoulder anchor 54, and is pulled-out toward the seated vehicle occupant side.

Here, the other end portion of the seatbelt 50 is fixed to an anchor plate (not illustrated) that is fixed to the vehicle transverse direction outer side of the vehicle floor 26. Further, the intermediate portion of the seatbelt 50 is inserted-through an unillustrated tongue plate. The tongue plate can be engaged with and removed from an unillustrated buckle device that is fixed to the side portion of the lower portion seat frame 20, which side portion is at the side opposite the anchor plate (is at the vehicle transverse direction central side of the vehicle floor 26). In the state in which the seatbelt 50 is pulled-out from the retractor, due the tongue plate being engaged with the buckle device, the upper body of the seated vehicle occupant is restrained and the lumbar region of the seated vehicle occupant is restrained by this seatbelt 50.

Figure 2:
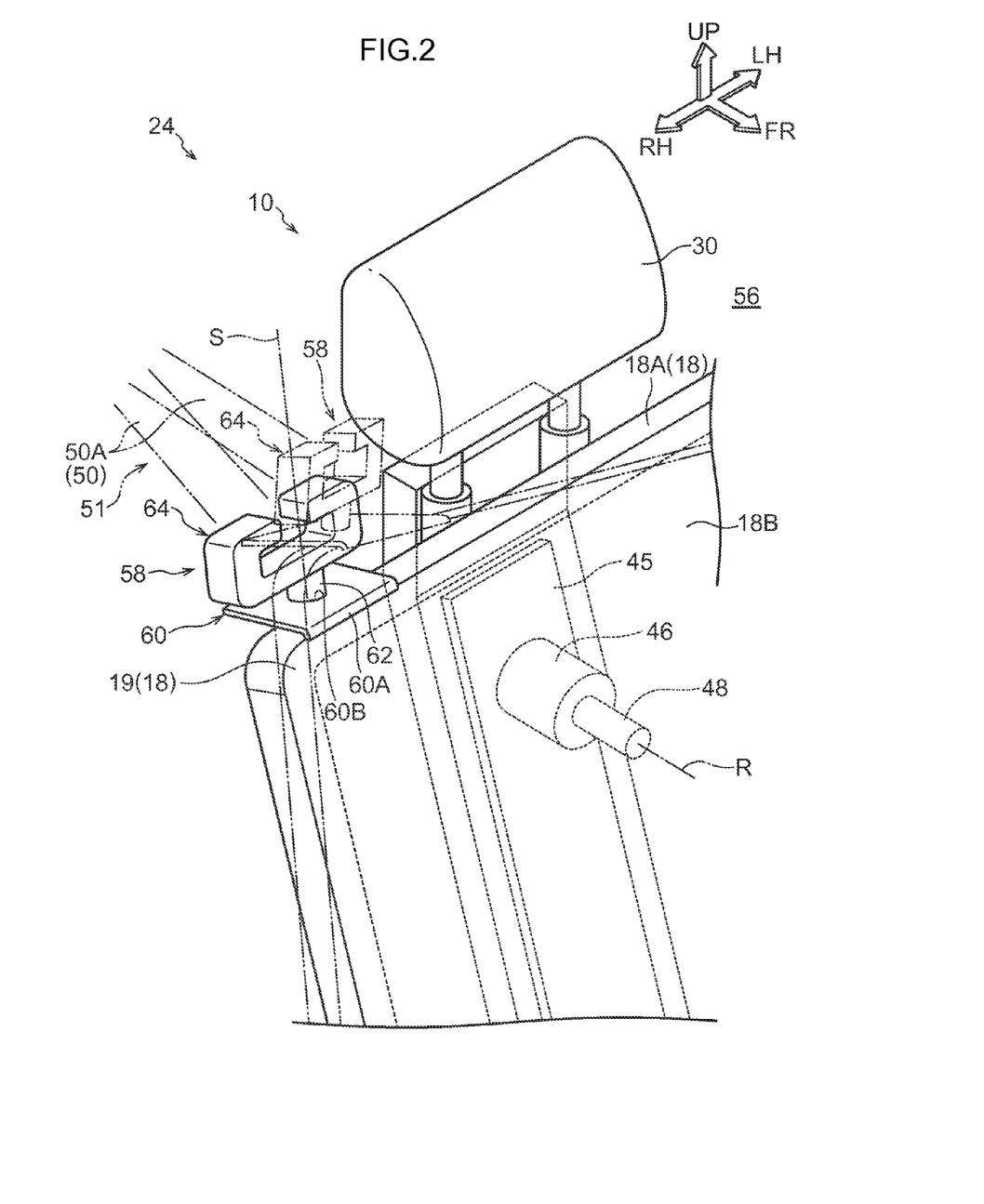
FIG. 2 is an enlarged perspective view of main portions, in which main portions of the vehicle seat in FIG. 1 are enlarged.
Figure 3A:
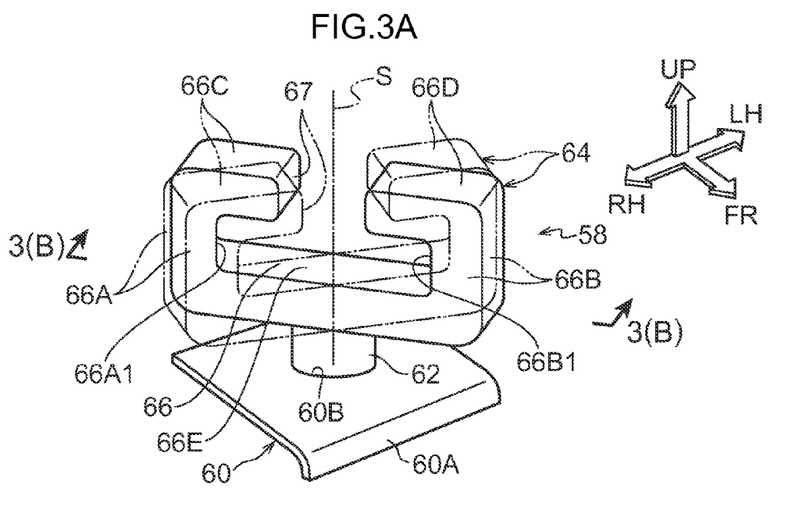
FIG. 3A is an enlarged perspective view in which a belt guide of the vehicle seat in FIG. 1 is enlarged.
Figure 3B:
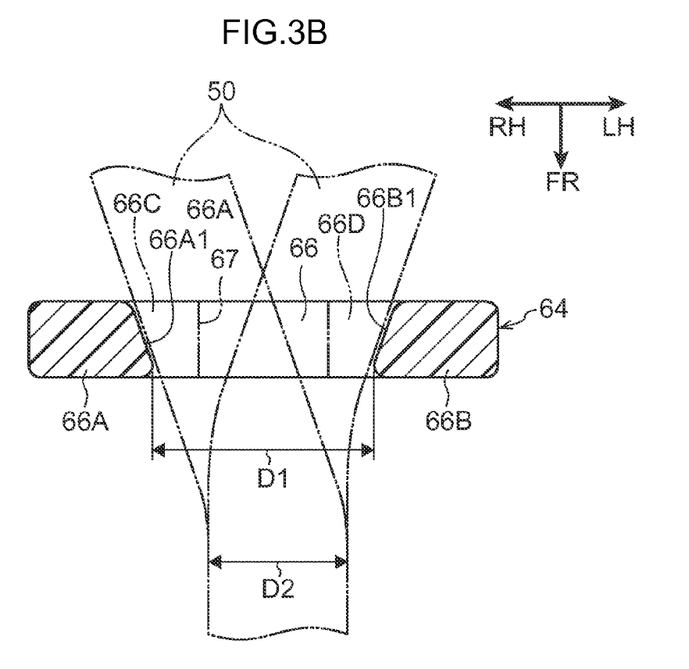
FIG. 3B is a cross-sectional view cut along line 3(B)-3(B) of FIG. 3A.

Here, enlarged views of main portions, in which a belt guide 58 that is shown in FIG. 1 and that is described later is enlarged, are shown in FIG. 2 and FIG. 3A. Note that FIG. 3B is a cross-sectional view that is cut along line 3(B)-3(B) of FIG. 3A.

As shown in FIG. 2, in the present embodiment, the belt guide 58 is disposed at the vehicle transverse direction outer side of the top portion of the seat back 18. The belt guide 58 has a base portion 60 that is made of metal and is substantially rectangular plate shaped. The base portion 60 is welded to a seat back frame 19, that is made of metal and that structures a portion of the seat back 18, such that the base portion 60 is substantially parallel to a top end surface 18A of the seat back 18. Note that this seat back frame 19 is a member that structures the outer shape of the seat back 18, and is frame-shaped for example.

A bent piece 60A that is bent downward is provided at the front portion of the base portion 60. The bent piece 60A abuts the front portion of the seat back frame 19. Due to the bent piece 60A abutting the front portion of the seat back frame 19, at the time when the base portion 60 is welded to the seat back frame 19, movement of the base portion 60 toward the vehicle rear side is restricted, and positioning of the belt guide 58 with respect to the vehicle longitudinal direction of the seat back 18 is carried out.

Further, a hole portion 60B that is circular is formed in the central portion of the base portion 60. An unillustrated bearing, whose axis S is a line running substantially along the vehicle vertical direction, is mounted in this hole portion 60B. A shaft portion 62, that is cylindrical and is made of metal and serves as a rotating portion, is provided so as to rotate freely within the hole portion 60B via this bearing.

Further, although not illustrated, for example, a convex portion is provided at the outer peripheral surface of one end side of the shaft portion 62, and two abutment portions, that this convex portion can abut, are provided at the base portion 60 side at the peripheral portion of the hole portion 60B along the peripheral direction of the hole portion 60B. The convex portion can move between the abutment portion and the abutment portion, and, due to the convex portion abutting an abutment portion, rotational movement of the shaft portion 62 is restricted via the convex portion. In this way, the shaft portion 62 is supported so as to be able to rotate within a predetermined range (e.g., ±approximately 10°) with respect to the base portion 60. Note that this angle can be set appropriately in accordance with the swinging angles of the seating portion 16 and the seat back 18, or the like.

As shown in FIG. 3A, a belt guide portion 64, that is substantially C-shaped and guides the seatbelt 50, is provided integrally with the shaft portion 62 at the other end side of the shaft portion 62. An insert-through portion 66, that is upside-down T-shaped and through which the seatbelt 50 is inserted, is provided at the center of the belt guide portion 64. Due to the belt guide portion 64 and the shaft portion 62 being provided integrally, the belt guide portion 64 can rotate around the axis S via the shaft portion 62.

As shown in FIG. 3B, a pair of wall portions 66A, 66B, that are shaped as rectangular columns and that face one another in the belt transverse direction, are provided at the insert-through portion 66. A separated distance D1 between the distal end portion of the wall portion 66A and the distal end portion of the wall portion 66B is set to be wider than a width D2 of the seatbelt 50. Further, wall surfaces 66A1, 66B1, that respectively serve as inclined surfaces, are provided at the wall portion 66A, 66B so as to face one another in the belt transverse direction. Moreover, these wall surfaces 66A1, 66B1 are positioned at the root portions of hook portions 66C, 66D that are described later, and are inclined in directions of moving away from one another while heading toward the vehicle rear side. Namely, the opening width of the insert-through portion 66 widens toward the rear side.

Further, as shown in FIG. 3A, the hook portions 66C, 66D, that are shaped as rectangular columns and that extend substantially horizontally in directions of approaching one another from the upper end portions of the wall portions 66A, 66B, are respectively provided above the insert-through portion 66. An opening portion 67 is provided between the distal end portion of the hook portion 66C and the distal end portion of the hook portion 66D. The seatbelt 50 (see FIG. 3B) can be attached to and removed from the belt guide portion 64 through this opening portion 67. Further, the opening width of the opening portion 67 is set so as to be narrower than the width D2 of the seatbelt 50, such that the seatbelt 50 that is within the insert-through portion 66 cannot easily come-out.

Operation/Effects of Vehicle Seat

Operation/effects of the vehicle seat relating to the embodiment of the present invention are described next.

As shown in FIG. 1, in the present embodiment, at the vehicle seat 10, the seating portion supporting mechanism 34 is provided at the lower portion seat frame 20 that structures a portion of the seat main body frame 14, and the seating portion 16 is made able to swing along the roll direction and the yaw direction of the vehicle 24.

Due thereto, for example, although not illustrated, in a case in which the vehicle 24 turns right (in the arrow A direction), due to centrifugal force, the right side of the pelvis of the vehicle occupant who is seated on the seating portion 16 moves further downward than the left side of the pelvis, and the vehicle occupant becomes a posture in which the right side of the pelvis has moved further rearward than the left side of the pelvis. Following the posture of the vehicle occupant, the seating portion 16 swings such that the right side thereof is displaced further downward than the left side, and the right side thereof is displaced further rearward than the left side. Namely, due to the seating portion 16 being structured so as to be able to swing along the roll direction and the yaw direction of the vehicle 24, at the time when the vehicle 24 turns, the lumbar region of the vehicle occupant can be moved in accordance with the direction in which the centrifugal force is applied.

Moreover, in the present embodiment, the seat back supporting mechanism 42 is provided at the upper portion seat frame 22 that structures the other portion of the seat main body frame 14, and the seat back 18 is made able to swing along the roll direction of the vehicle 24. Due thereto, for example, when the vehicle 24 turns right and the right side of the seating portion 16 swings so as to become lower than the left side as described above, in order to ensure the line of sight (the position of the head portion) of the vehicle occupant, the upper body of the vehicle occupant swings toward the side opposite the pelvis, and becomes a posture in which the right side of the shoulder blade is moved further upward than the left side of the shoulder blade. Following the posture of the vehicle occupant, the seat back 18 swings such that the right side thereof becomes higher than the left side. Namely, due to the turning of the vehicle 24, the trunk muscle of vehicle occupant P can be moved due to the seating portion 16 and the seat back 18 swinging in mutually opposite directions along the roll direction of the vehicle 24.

Here, in the present embodiment, the belt guide 58 is set at the vehicle transverse direction outer side of the top portion of the seat back 18. Further, as shown in FIG. 2, the belt guide portion 64 that structures a portion of the belt guide 58 is able to rotate around the axis S with the shaft portion 62 being the center. Due thereto, in the present embodiment, in the state in which the upper body of the vehicle occupant is restrained by the seatbelt 50, the seatbelt 50 can, via the belt guide portion 64, be made to follow the position of the shoulder portion of the vehicle occupant in accordance with the posture of the vehicle occupant.

Figure 4A:
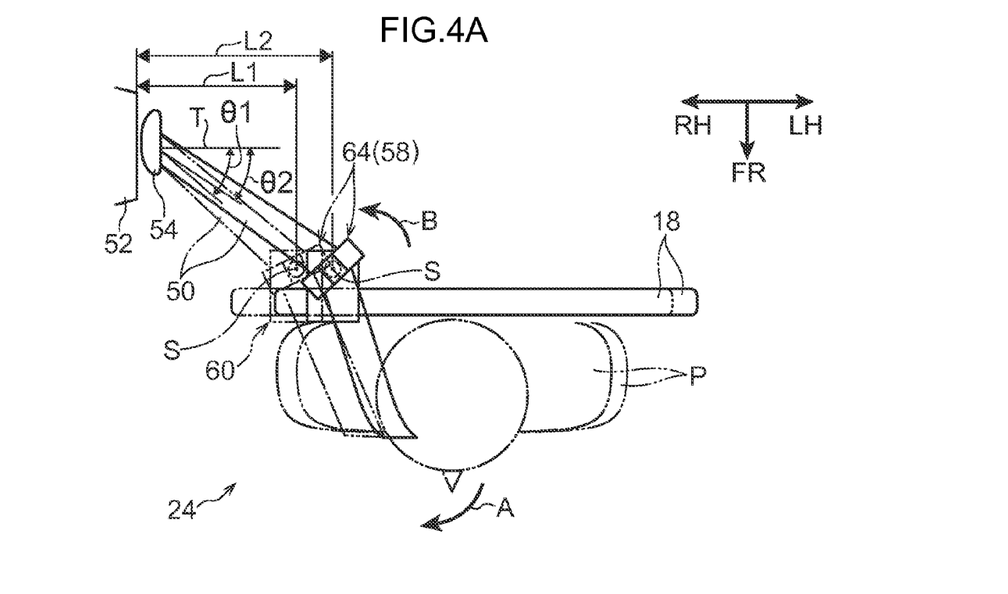
FIG. 4A is a plan view showing a state, at a time when a vehicle turns right, of the vehicle seat relating to the present embodiment.
Figure 4B:
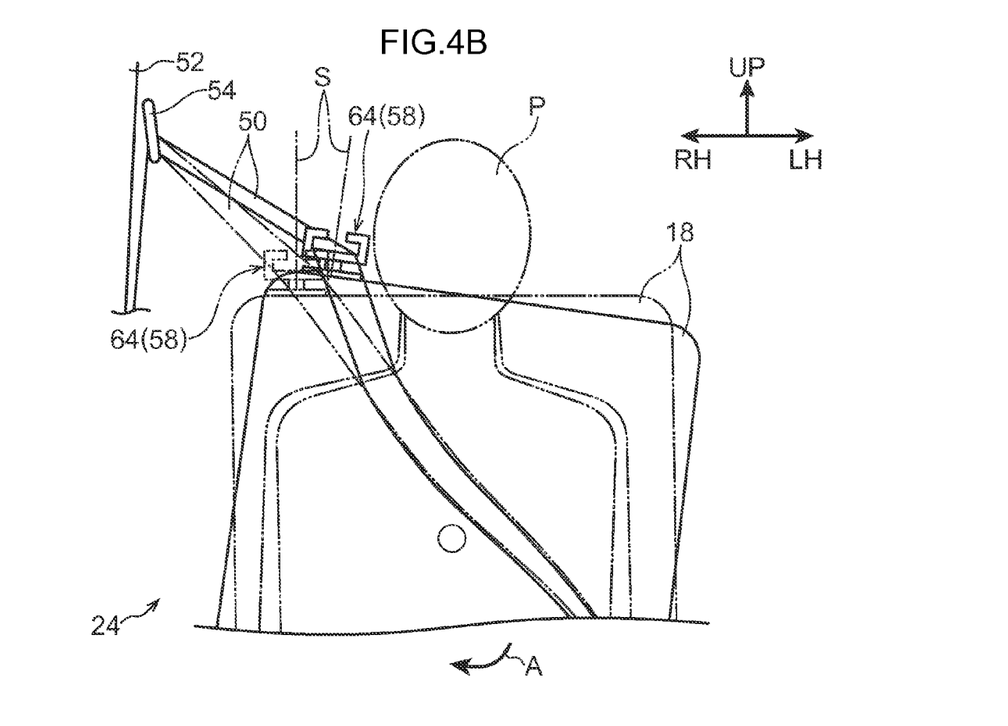
FIG. 4B is a front view showing the state, at the time when the vehicle turns right, of the vehicle seat relating to the present embodiment.

Concretely, as shown in FIGS. 4A and 4B, for example, when the vehicle 24 turns right (in the arrow A direction), as described above, the right side of the seat back 18 swings so as to become higher than the left side, via the upper body of the vehicle occupant P who is seated on the seating portion 16. At this time, the belt guide portion 64 moves in the direction of moving away from the shoulder anchor 54 in the vehicle transverse direction (from L1 to L2), and the angle, that is formed between a reference line T that runs along the vehicle transverse direction and a straight line (the seatbelt 50) that connects the shoulder anchor 54 and the belt guide portion 64, becomes smaller (from θ1 to θ2). Due thereto, the seatbelt 50, that is inserted-through the interior of the insert-through portion 66 of the belt guide portion 64, pushes the wall surface 66A1 (see FIG. 3B), and rotates the belt guide portion 64 in the arrow B direction via this wall surface 66A1.

Figure 5A:
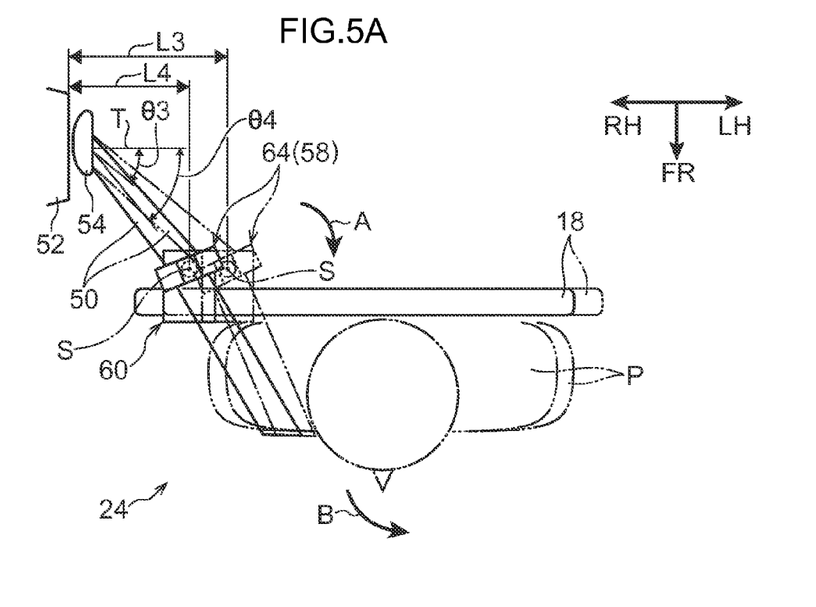
FIG. 5A is a plan view showing a state, at a time when the vehicle turns left, of the vehicle seat relating to the present embodiment.
Figure 5B:
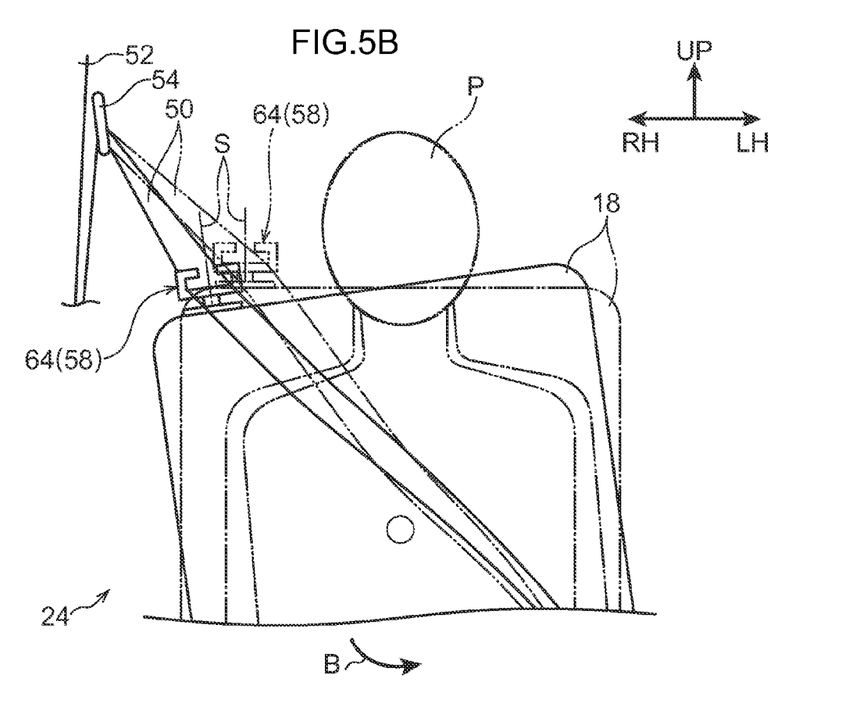
FIG. 5B is a front view showing the state, at the time when the vehicle turns left, of the vehicle seat relating to the present embodiment.

On the other hand, as shown in FIGS. 5A and 5B, when the vehicle 24 turns left (in the arrow B direction), the left side of the seat back 18 swings so as to become higher than the right side, via the upper body of the vehicle occupant P who is seated on the seating portion 16. At this time, the belt guide portion 64 moves in the direction of approaching the shoulder anchor 54 in the vehicle transverse direction (from L3 to L4), and the angle, that is formed between the reference line T that runs along the vehicle transverse direction and a straight line (the seatbelt 50) that connects the shoulder anchor 54 and the belt guide portion 64, becomes larger (from θ3 to θ4). Due thereto, the seatbelt 50, that is inserted-through the interior of the insert-through portion 66 of the belt guide portion 64, pushes the wall surface 66B1 (see FIG. 3B), and rotates the belt guide portion 64 in the arrow A direction via this wall surface 66B1.

In this way, due to the swinging of the seat back 18, relative distance (L) between the belt guide 58 and the shoulder anchor 54, and angle (θ) that is formed between the reference line T that runs along the vehicle transverse direction and a straight line (the seatbelt 50) that connects the shoulder anchor 54 and the belt guide portion 64, change. Namely, due to the direction of the external force, that is due to the belt tension that is applied to the belt guide 58, changing, the belt guide portion 64 rotates around the axis S due to this belt tension.

Accordingly, in accordance with the present embodiment, even if the posture of the upper body of the vehicle occupant P who is restrained by the seatbelt 50 changes, the belt guide portion 64 can be rotated following the movement of the shoulder portion of the vehicle occupant P. Due to this rotation of the belt guide portion 64, the seatbelt 50 can be made to follow via the belt guide portion 64.

Namely, even if the posture of the upper body of the vehicle occupant P whose is restrained by the seatbelt 50 changes, the vehicle occupant P can be restricted by the seatbelt 50 at substantially the same belt tension. Accordingly, even if the vehicle occupant P who is supported at the seat back 18 swings along the vehicle transverse direction due to turning of the vehicle 24, the seatbelt 50 can be made to follow the position of the shoulder portion of the vehicle occupant P, and therefore, it can be made such that the seatbelt 50 does not come-off of the shoulder portion of the vehicle occupant P.

Further, for example, when the belt tension of the seatbelt 50 increases due to a so-called pretensioner mechanism that eliminates slack of the seatbelt 50 before a collision of the vehicle 24, in accordance with the present embodiment, the belt guide portion 64 rotates following the movement of the shoulder portion of the vehicle occupant P. Therefore, the load that is applied to the vehicle occupant P can be reduced as compared with a case in which the belt guide portion 64 does not rotate.

On the other hand, as shown in FIGS. 3A and 3B, the wall portions 66A, 66B that face one another are provided at the insert-through portion 66 of the belt guide portion 64. Further, the wall surfaces 66A1, 66B1 of these wall portions 66A, 66B are inclined in directions of moving away from one another while heading toward the vehicle rear side, respectively.

Due thereto, when viewing the belt guide portion 64 from above for example, at a bottom wall surface 66E that structures a portion of the insert-through portion 66, the amount of overlap with the hook portions 66C, 66D is greater at the rear portion than at the front portion. Namely, the range over which the seatbelt 50 catches on the hook portions 66C, 66D of the belt guide portion 64 is greater. Because the shoulder anchor 54 (see FIG. 1) is provided at the rear side of the belt guide portion 64, by increasing the range of catching of the seatbelt 50 at the rear portion of the belt guide portion 64, it can be made difficult for the seatbelt 50 to come-out from the belt guide portion 64.

Other Embodiments (1) In the present embodiment, as shown in FIG. 1, at the vehicle seat 10, the seat back 18 and the seating portion 16 are able to swing along the roll direction of the vehicle 24.

However, because it suffices for the belt guide portion 64 to be able to rotate, it is not absolutely necessary for the seat back 18 and the seating portion 16 to be swingable. Further, there may be a structure in which only either one among the seat back 18 and the seating portion 16 is swingable.

To describe further, in the present embodiment, the seat back 18 and the seating portion 16 can swing along the roll direction of the vehicle 24. Therefore, as described above, when the vehicle 24 turns right (in the direction of arrow A), as shown in FIGS. 4A and 4B, the right side of the seating portion 16 swings so as to become lower than the left side. On the other hand, the upper body of the vehicle occupant P swings toward the side opposite the pelvis and becomes a posture in which the right side of the shoulder blade has moved higher than the left side of the shoulder blade, and the seat back 18 swings such that the right side becomes higher than the left side, and the direction of rotation of the belt guide portion 64 becomes the arrow B direction (see FIG. 4A).

However, in a case in which only the seat back 18 is able to swing along the roll direction of the vehicle 24, although not illustrated, the upper body of the vehicle occupant, due to centrifugal force, becomes a posture in which the left side of the shoulder blade has moved higher than the right side of the shoulder blade (see FIG. 5B). Therefore, the seat back 18 swings such that the left side becomes higher than the right side, and the direction of rotation of the belt guide portion 64 becomes the arrow A direction (see FIG. 5A). Accordingly, in this case as well, the orientation of the seatbelt 50 can be changed following the movement of the upper body of vehicle occupant P.

(2) Further, in the present embodiment, as shown in FIG. 3A, at the belt guide 58, the belt guide portion 64 and the shaft portion 62 are provided integrally, and the shaft portion 62 is provided so as to be able to rotate with respect to the base portion 60 via the bearing (not shown). However, because it suffices for the belt guide portion 64 to be rotatable, the present invention is not limited to this.

For example, although not illustrated, the shaft portion 62 may be set so as to be able to rotate directly with respect to the seat back frame.

Figure 6A:
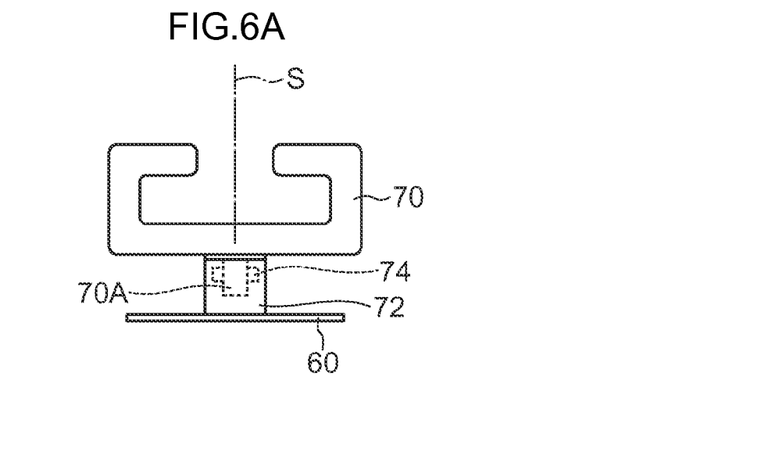
FIGS. 6A through 6D are front views showing modified examples of another embodiment 2 of the vehicle seat relating to the present embodiment.

Further, as shown in FIG. 6A, a belt guide portion 70 and a shaft portion 72 that serves as a rotating portion may be provided as separate members. In this case, the shaft portion 72 is fixed to the base portion 60, and an insertion portion 70A, that is provided at the lower portion of the belt guide portion 70, is made able to be inserted into the shaft portion 72. Further, the belt guide portion 72 may be set so as to be able to rotate with respect to the base portion 60, via a bearing 74 that serves as a rotating portion and is provided at the insertion portion 70A.

Figure 6B:
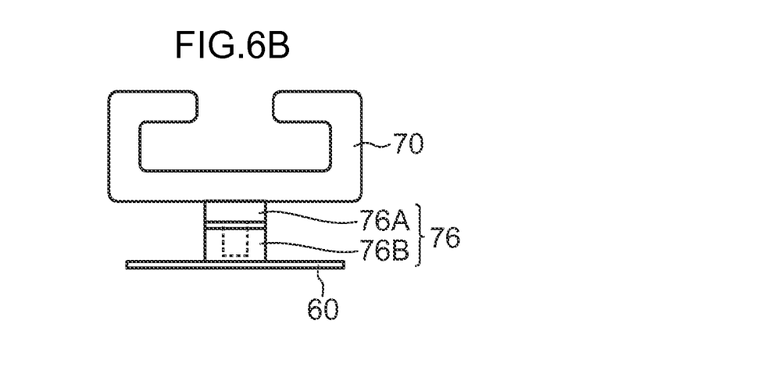

Further, other than this, as shown in FIG. 6B, a shaft portion 76 that serves as a rotating portion may be divided into an upper shaft portion 76A and a lower shaft portion 76B, and the lower shaft portion 76B may be fixed to the base portion 60, and the upper shaft portion 76A may be set so as to be able to rotate with respect to the lower shaft portion 76B.

Further, in the above-described embodiment, an axis that runs substantially along the vehicle vertical direction is made to be the axis S (see FIG. 6A) of the belt guide portion 64, and the belt guide portion 64 is set to as to be able to rotate around this axis S. However, other than this, for example, the belt guide portion 64 may be made to be rotated around an axis (not shown) whose upper portion is tilted toward the vehicle longitudinal direction rear side with respect to an axis that runs along the vehicle vertical direction.

Figure 6C:
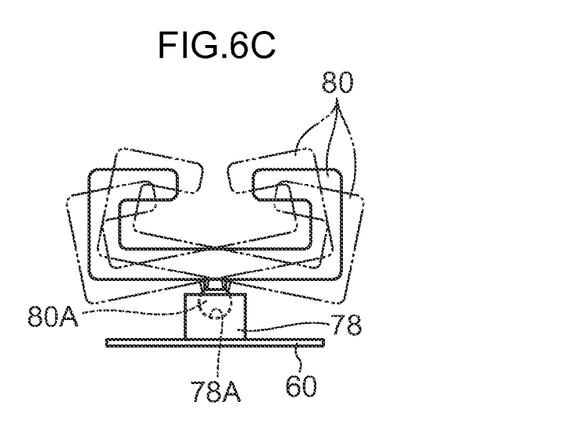
Figure 6D:
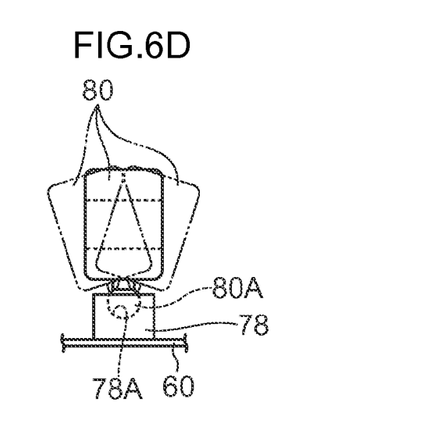

Moreover, for example, as shown in FIGS. 6C and 6D, a concave portion 78A that is hemispherical is formed in the top surface of a shaft portion 78 that serves as a rotating portion and is fixed to the base portion 60, and a spherical portion 80A, that serves as a rotating portion and is able to slide smoothly within this concave portion 78A, is provided at a belt guide portion 80. Further, the belt guide portion 80 may be made able to rotate freely via this spherical portion 80A. Due thereto, the degrees of freedom in the rotation of the belt guide portion 64 are increased more.

(3) Further, as shown in FIG. 3A, in the above-described embodiment, the insert-through portion 66 that is shaped as an upside-down T is provided at the belt guide portion 64, and the hook portions 66C, 66D extend in directions of approaching one another from the upper end portions of the wall portions 66A, 66B that structure portions of the insert-through portion 66. Further, the opening portion 67 is provided between the distal end portion of the hook portion 66C and the distal end portion of the hook portion 66D. However, the shape of the belt guide portion 64 is not limited to this.

Figure 7A:
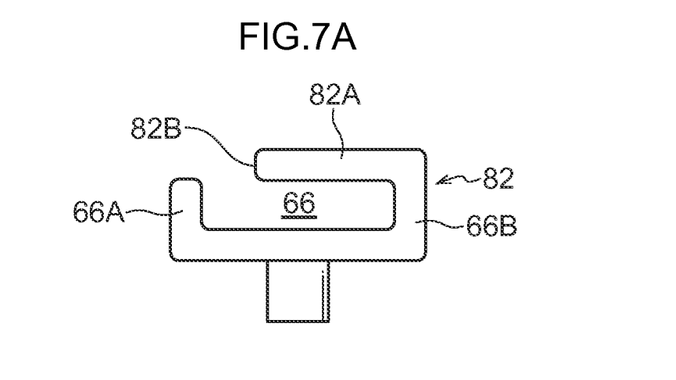
FIGS. 7A through 7C are front views showing modified examples of another embodiment 3 of the vehicle seat relating to the present embodiment.

For example, as shown in FIG. 7A, at a belt guide portion 82, a hook portion 82A may be provided only at the wall portion 66B side, and an opening portion 82B may be provided between the upper end portion of the wall portion 66A and the distal end portion of the hook portion 82A.

Figure 7B:
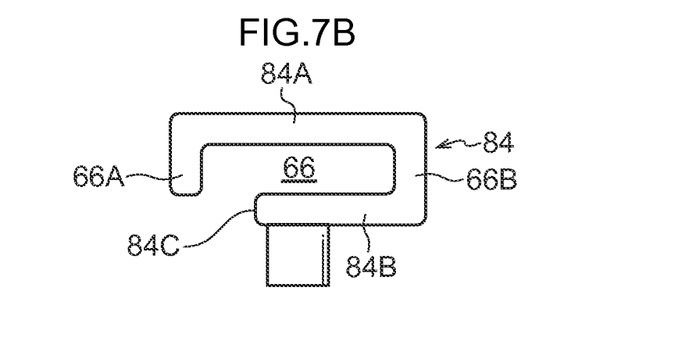

Further, other than this, as shown in FIG. 7B, at a belt guide portion 84, an opening portion 84C may be provided at the wall portion 66A side of a bottom wall portion 84B.

Figure 7C:
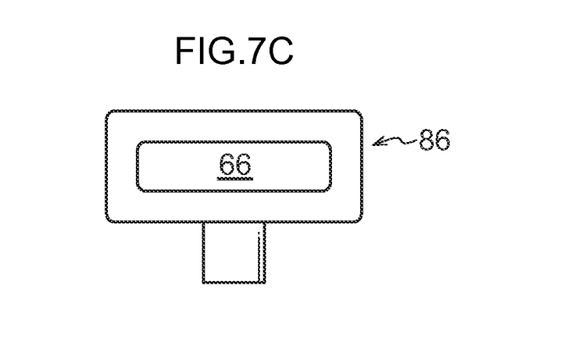

Moreover, as in a belt guide portion 86 that is shown in FIG. 7C, an opening portion is not absolutely necessary. Still further, the shape of the insert-through portion 66 does not have to be a substantially rectangular shape, and may be a circular shape or the like, and can be changed appropriately in accordance with the design of the vehicle interior, or the like.

(4) In the above-described embodiment, as shown in FIG. 3A, the belt guide portion 64 can rotate around the predetermined axis S in the state in which the belt guide 58 is fixed to the base portion 60. However, the present invention is not limited to this.

Figure 8A:
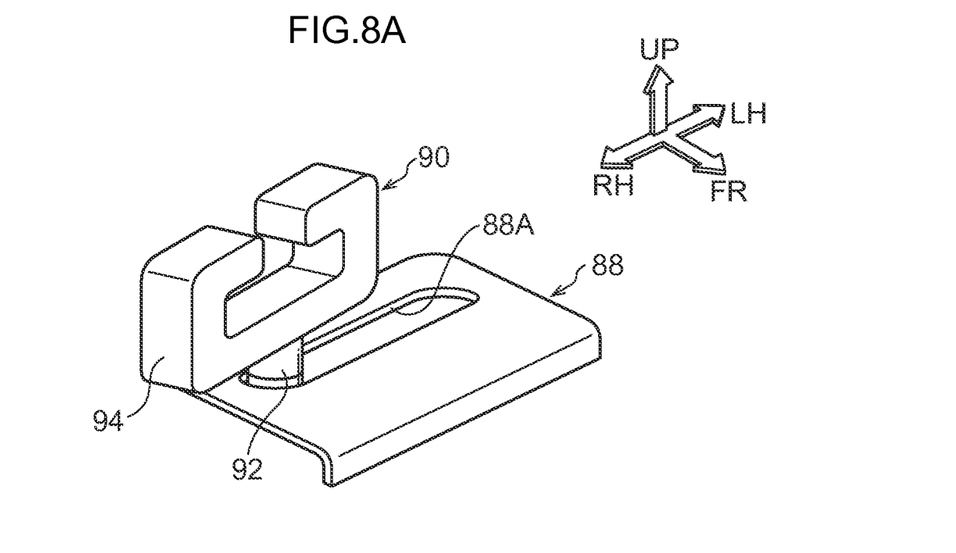
FIGS. 8A and 8B are perspective views that correspond to FIG. 3A and that show modified examples of another embodiment 4 of the vehicle seat relating to the present embodiment.

For example, as shown in FIG. 8A, as a slide portion, a long hole portion 88A may be formed along the vehicle transverse direction in a base portion 88, and a shaft portion 92 of a belt guide 90 may be set so as to be able to slide within the long hole portion 88A along the long hole portion 88A. In this case, a belt guide portion 94 is able to rotate with respect to the shaft portion 92. Further, although not illustrated, the shaft portion 92 is prevented from being pulled-out and positioning of the shaft portion 92 is carried out, due to the lower end portion of the shaft portion 92 being fastened by a bolt or the like whose width is greater than the long hole portion 88A.

Figure 8B:
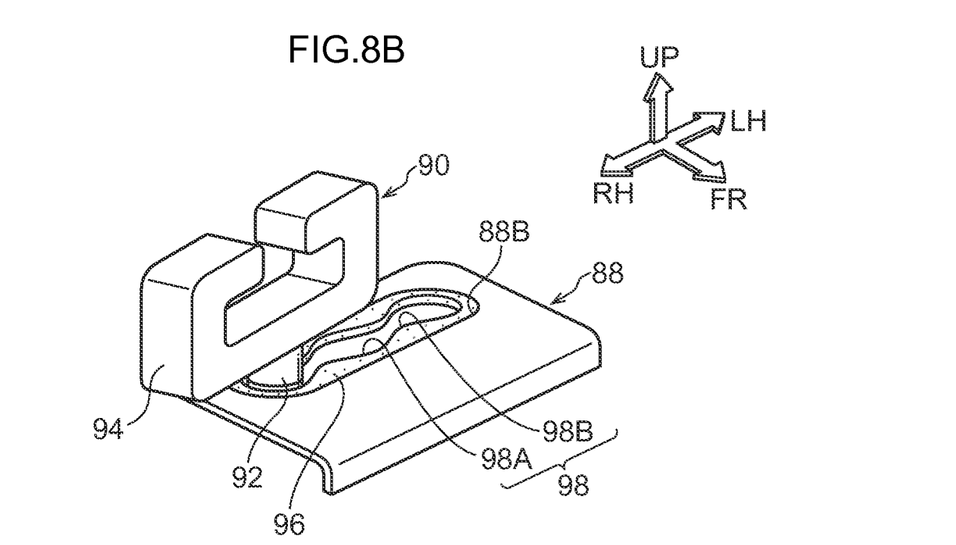

Further, other than this, as shown in FIG. 8B, an elastic member 96 may be provided at the inner side of a long hole portion 88B that serves as a slide portion, and a hole portion 98 whose width differs along the length direction may be formed in the central portion of this elastic member 96, and the shaft portion 92 may be fixed at a wide portion 98A of the hole portion 98. Note that, when the position of the shaft portion 92 is changed, the shaft portion 92 elastically deforms the elastic member 96 and passes-through a narrow portion 98B. Moreover, although not illustrated, the cross-sectional shape of the shaft portion may be made to be oval, and the shaft portion may be made able to pass-through the narrow portion 98B by rotating the shaft portion.

By making the belt guide 90 be able to slide along the vehicle transverse direction in this way, the belt guide 90 can be fixed at an appropriate position in accordance with the physique of the vehicle occupant P who is seated at the seat main body 12.

(5) Further, in the present embodiment, for example, the seat back 18 is substantially rectangular as seen in a front view, as shown in FIG. 1. Therefore, the base portion 88 is mounted to the seat back 18 along the vehicle transverse direction. However, the shape of the seat back 18 is not limited to this.

Figure 9:
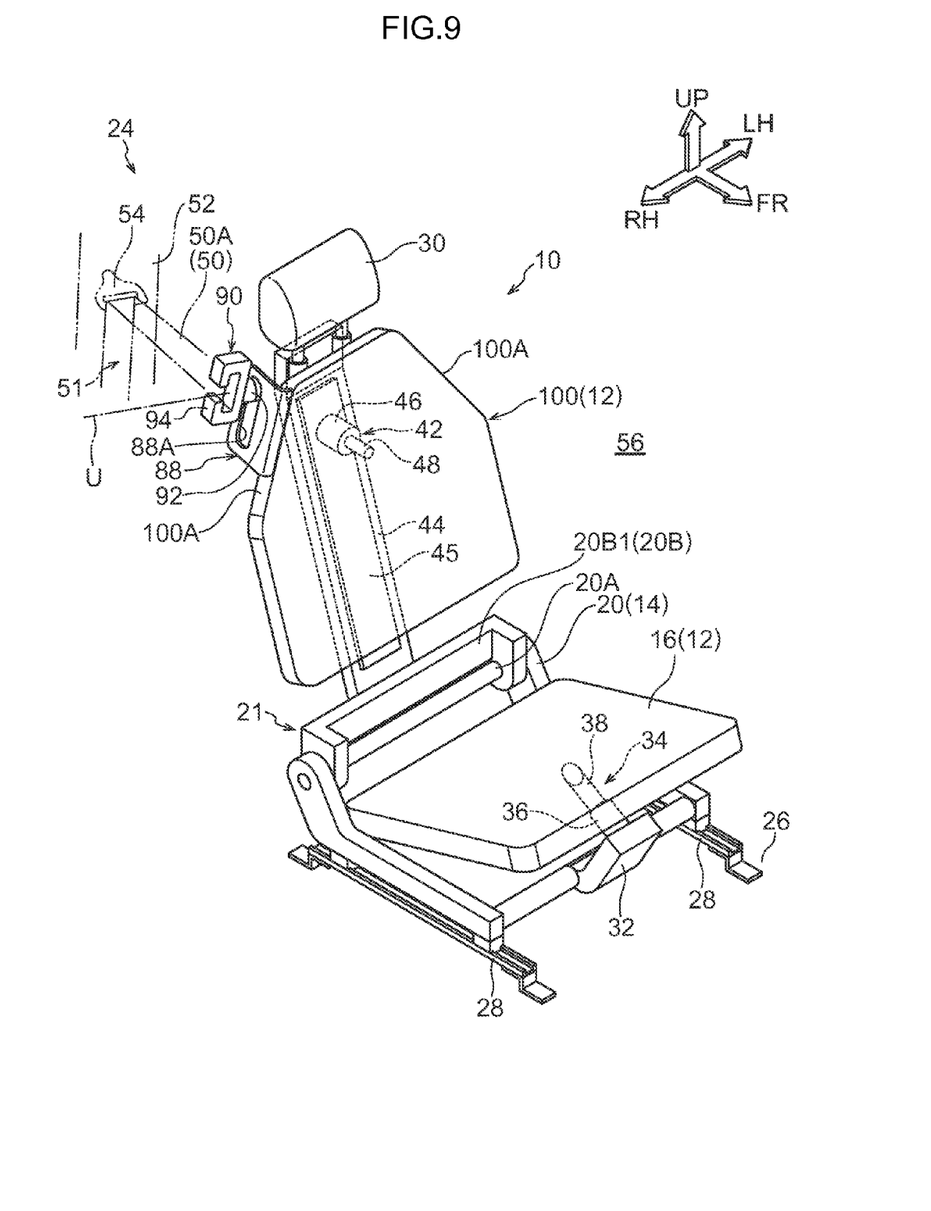
FIG. 9 is a perspective view that corresponds to FIG. 1 and that shows a modified example of another embodiment 5 of the vehicle seat relating to the present embodiment.

For example, as shown in FIG. 9, in a case in which a seat back 100 is polygonal and the upper portion of the seat back 100 is a shape in which the corner portions at the both sides in the vehicle transverse direction are cut-off, inclined portions 100A, that are inclined downward while heading toward the vehicle transverse direction outer sides, are provided at the upper portion of the seat back 100.

In this case, the base portion 88 is welded substantially parallel to the inclined portion 100A. Therefore, the belt guide 90 is made able to rotate around axis U that runs substantially along the vehicle transverse direction. On the other hand, because the base portion 88 is provided along the vehicle transverse direction and the vehicle vertical direction, the belt guide 90 is slidable along the vehicle transverse direction and the vehicle vertical direction. Namely, in accordance with the present embodiment, the belt guide 90 can be set at an appropriate position in accordance with the shape of the seat back 100. Note that, although the belt guide 90 is set so as to be slidable here, the belt guide 90 does not necessarily have to be slidable.

(6) Moreover, in the present embodiment, the belt guide 58 is provided at the seat back 18 as shown in FIG. 1, but the present invention is not limited to this.

Figure 10A:
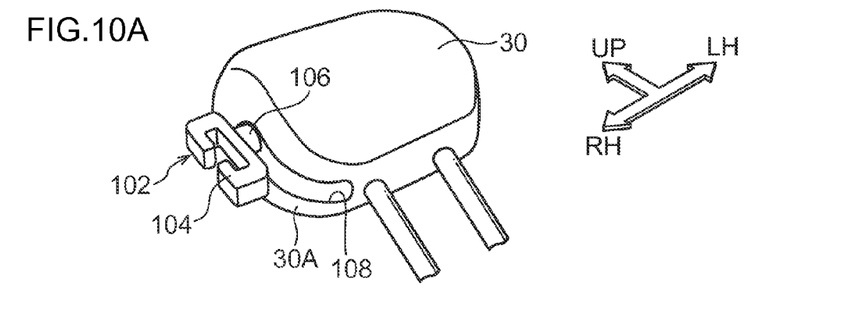
FIGS. 10A through 10C are perspective views showing modified examples of another embodiment 6 of the vehicle seat relating to the present embodiment.

For example, as shown in FIG. 10A, a belt guide 102 may be provided at the headrest 30. In this case, the belt guide 102 is provided at an outer side portion 30A in the vehicle transverse direction of the headrest 30, and a shaft portion 106, that rotates a belt guide portion 104, is disposed along the vehicle transverse direction. Further, a long hole 108 serving as a slide portion is formed along the vehicle vertical direction of the outer side portion 30A of the headrest 30. Note that a portion of the long hole portion 108 is formed along the vehicle transverse direction at the lower portion of the outer side portion 30A.

Figure 10B:
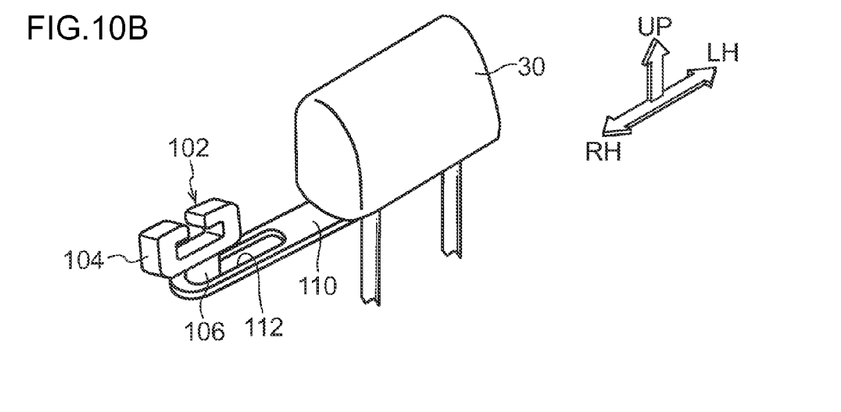

Other than this, as shown in FIG. 10B, a slide piece 110 may jut-out from the lower portion of the headrest 30 toward the vehicle transverse direction outer side, and a long hole portion 112 serving as a slide portion may be formed in this slide piece 110. Further, the shaft portion 106 of the belt guide portion 104, that structures a portion of the belt guide 102, is engaged with this long hole portion 112.

Figure 10C:
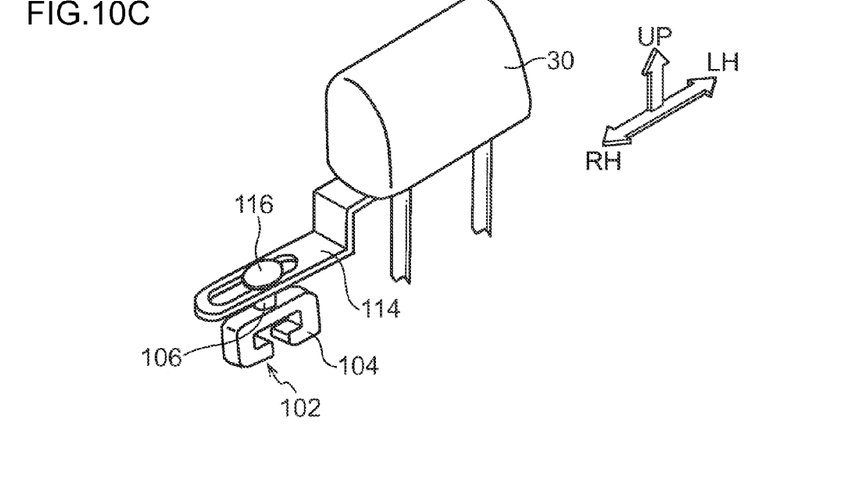

Moreover, as shown in FIG. 10C, the belt guide 102 may be mounted to the lower side of a slide piece 114 that juts-out from the lower portion of the headrest 30 toward the vehicle transverse direction outer side. In this case, the belt guide 102 is positioned with respect to the length direction of the slide piece 114, but because a fastener 116 for fixing the belt guide 102 at a predetermined position is exposed toward the upper side, fastening or releasing of the fastening of this fastener 116 can be carried out easily.

Note that, although the present invention can be applied to the driver's seat side and the front passenger's seat side, the present invention may be applied to only the driver's seat side.

An embodiment of the present invention has been described above. However, the present invention is not limited to this embodiment, and the embodiment and various modified examples may be used by being combined appropriately. The present invention can, of course, be implemented in various forms within a scope that does not depart from the gist thereof.

What is claimed is:

1. A vehicle seat comprising:
   a seat main body that is structured to include a seating portion configured for a vehicle occupant to sit on, a seat back configured to support an upper body of the vehicle occupant when the vehicle occupant is seated on the seating portion, and a headrest that is provided at an upper side of the seat back and configured to support a head portion of the vehicle occupant;
   a seatbelt configured to restrain the upper body of the vehicle occupant with respect to the seat back when the vehicle occupant is seated on the seating portion;
   a belt guide portion that is provided at an upper portion of the seat back or at the headrest, and through which the seatbelt is inserted, and that guides the seatbelt; and
   a rotating portion that, following movement of a shoulder portion of the vehicle occupant whose upper body is restrained by the seatbelt, changes a direction of guiding the seatbelt by rotating the belt guide portion by external force that is applied due to tension of the seatbelt,
     wherein the rotating portion extends in a vehicle vertical direction through a slide portion formed in a base portion, the slide portion being a hole elongating in a vehicle transverse direction, such that, following movement of the shoulder portion of the vehicle occupant whose upper body is restrained by the seatbelt, the belt guide portion is able to slide at least along the vehicle transverse direction.

2. The vehicle seat of claim 1, wherein the rotating portion includes a shaft portion that rotates the belt guide portion around an axis that runs at least along the vehicle vertical direction.

3. The vehicle seat of claim 1, further comprising a first swinging portion that swings the seat back around a first axis that runs along a vehicle longitudinal direction.

4. The vehicle seat of claim 1, further comprising a swinging portion that swings the seating portion around a axis that runs along a vehicle longitudinal direction.

5. The vehicle seat of claim 1, wherein the belt guide portion is structured to include:
   a pair of wall portions that are disposed so as to face one another, and that restrict movement of the seatbelt in a belt transverse direction;
   hook portions that extend in directions of approaching one another from upper end portions of the wall portions; and
   inclined surfaces that are formed at facing regions of the pair of wall portions, and that are inclined in directions of moving away from one another while heading toward a vehicle longitudinal direction rear side.

6. The vehicle seat of claim 1,
   wherein the rotating portion comprises a shaft portion, with respect to which the belt guide portion is able to rotate;
   and
   wherein the shaft portion is able to slide within the slide portion.

* * * * *